(12) United States Patent
Kim et al.

(10) Patent No.: US 10,245,901 B2
(45) Date of Patent: Apr. 2, 2019

(54) CAVITY NOISE REDUCTION TIRE

(71) Applicant: KUMHO TIRE CO., INC., Gwangju (KR)

(72) Inventors: Hyoungseok Kim, Busan (KR); Jongsik Lee, Gwangju (KR); Seong Jin Seo, Yongin-si (KR); Pyeong-Hwa Park, Yongin-si (KR)

(73) Assignee: KUMHO TIRE CO., INC., Gwangju (KR)

( * ) Notice: Subject to any disclaimer, the term of this patent is extended or adjusted under 35 U.S.C. 154(b) by 664 days.

(21) Appl. No.: 14/601,491

(22) Filed: Jan. 21, 2015

(65) Prior Publication Data
US 2015/0306922 A1    Oct. 29, 2015

(30) Foreign Application Priority Data

Apr. 25, 2014 (KR) .................. 10-2014-0050108
Apr. 25, 2014 (KR) .................. 10-2014-0050109

(51) Int. Cl.
B60C 19/00 (2006.01)
B60C 1/00 (2006.01)

(52) U.S. Cl.
CPC .............. B60C 19/002 (2013.01); B60C 1/00 (2013.01)

(58) Field of Classification Search
CPC .................................................. B60C 19/002
USPC .............. 152/450, 154.1; 181/210; 301/6.91
See application file for complete search history.

(56) References Cited

U.S. PATENT DOCUMENTS

| 2003/0020320 | A1* | 1/2003 | Yukawa | .................. B60B 3/04 |
| | | | | 301/6.91 |
| 2003/0188817 | A1* | 10/2003 | Yukawa | .................. B60B 3/04 |
| | | | | 152/381.6 |
| 2009/0038726 | A1* | 2/2009 | Yukawa | ................ B60C 19/002 |
| | | | | 152/454 |
| 2013/0087267 | A1* | 4/2013 | Sandstrom | ......... B29D 30/0061 |
| | | | | 156/123 |

FOREIGN PATENT DOCUMENTS

| CN | 1647956 | | 8/2005 | |
| CN | 1872572 | | 12/2006 | |
| CN | 102910039 | | 2/2013 | |
| EP | 1559590 | | 8/2005 | |
| EP | 1728650 | | 12/2006 | |
| EP | 1876038 | A1 * | 1/2008 | .......... B60C 19/002 |
| EP | 2554617 | | 2/2013 | |
| JP | 62216803 | | 9/1987 | |
| JP | 62216803 | A * | 9/1987 | .......... B60C 19/002 |

(Continued)

OTHER PUBLICATIONS

Machine Translation: JP 62216803 A; Fukushima, Hiroshige; no date.*

(Continued)

*Primary Examiner* — Kendra Ly
(74) *Attorney, Agent, or Firm* — Cantor Colburn LLP (57) ABSTRACT

A cavity noise reduction tire comprises a tread portion, a bead assembly being disposed at each side of the tread portion, and a sidewall portion for connecting the tread portion and the bead assembly. The tire has a ratio of the cross-sectional area of the sound-absorbing material to the cross-sectional area of the space formed by the internal surface of the tire which is to be about 23-29%.

7 Claims, 11 Drawing Sheets

(56) References Cited

FOREIGN PATENT DOCUMENTS

| | | | |
|---|---|---|---|
| JP | 2003048407 | | 2/2003 |
| JP | 2004291855 | | 10/2004 |
| JP | 2005048023 | | 2/2005 |
| JP | 2005048023 A * | | 2/2005 |
| JP | 2005138760 | | 6/2005 |
| JP | 2005262921 | | 9/2005 |
| JP | 3787343 | | 6/2006 |
| JP | 2006143021 | | 6/2006 |
| JP | 2006306302 | | 11/2006 |
| JP | 2007076548 | | 3/2007 |
| JP | 3974437 | | 9/2007 |
| JP | 4330550 | | 9/2009 |
| JP | 2010089683 | | 4/2010 |
| JP | 2010095209 | | 4/2010 |
| JP | 2010280340 | | 12/2010 |
| JP | 2011526556 | | 10/2011 |
| JP | 5078907 | | 11/2012 |
| KR | 1020080070862 | | 7/2008 |
| KR | 1020110042068 | | 4/2011 |
| WO | 2008038629 | | 4/2008 |
| WO | 2010000789 | | 1/2010 |
| WO | 2012090311 | | 7/2012 |

OTHER PUBLICATIONS

Machine Translation: JP 2005048023 A; Ishida, Takahiro; no date.*
European Search Report—European Application No. 15151751.3 dated Sep. 17, 2015, citing EP 2 554 617, JP S62 216803, EP 1 728 650 and EP 1 559 590.
Japanese Office Action—Japanese Application No. 2015-008132 dated Mar. 29, 2016, citing JP 62-216803, JP 2006-143021, WO 2012/090311, JP 2010-280340, JP 2005-048023, JP 3787343, JP 4330550 and JP 2006-306302.
Chinese Office Action—Chinese Application No. 201510047072.6 dated Aug. 18, 2016, citing CN 102910039, CN 1647956 and CN 1872572.

* cited by examiner

| | DENSITY (kg/m3) | ELASTICITY (%) | ELONGATION RATE (%) | TENSILE STRENGTH (kgf/cm2) | ADHESIVE STRENGTH (kgf) | LOW TEMPERATURE DURABILITY (10,000 TIMES) |
|---|---|---|---|---|---|---|
| COMPARISON EXAMPLE 1 | 32.64 | 18 | 138 | 2.02 | 1.14 | 224 |
| EXEMPLARY EMBODIMENT 1 | 35.24 | 25 | 343 | 2.34 | 1.40 | 327 |
| EXEMPLARY EMBODIMENT 2 | 31.25 | 23 | 324 | 2.20 | 1.10 | 313 |
| EXEMPLARY EMBODIMENT 3 | 49.69 | 20 | 136 | 1.22 | 0.97 | 284 |

Fig. 13

| | TENSILE STRENGTH(kgf/cm2) | ADHESIVE STRENGTH(kgf) |
|---|---|---|
| COMPARISON EXAMPLE 1 | 2.02 | 1.14 |
| EXEMPLARY EMBODIMENT 1 | 2.34 | 1.40 |
| EXEMPLARY EMBODIMENT 2 | 2.20 | 1.10 |
| EXEMPLARY EMBODIMENT 3 | 1.22 | 0.97 |

Fig. 14

| | ELASTICITY(%) | LOW TEMPERATURE DURABILITY (10,000 TIMES) |
|---|---|---|
| COMPARISON EXAMPLE 1 | 18 | 224 |
| EXEMPLARY EMBODIMENT 1 | 25 | 327 |
| EXEMPLARY EMBODIMENT 2 | 23 | 313 |
| EXEMPLARY EMBODIMENT 3 | 20 | 284 |

Fig. 15

CAVITY NOISE REDUCTION TIRE

BACKGROUND

1. Technical Field

The present invention relates to a cavity noise reduction tire, more particularly to a cavity noise reduction tire having a ratio of the cross-sectional area of the sound-absorbing material to the cross-sectional area of the space formed by the internal surface of the tire which is to be about 23-29%.

2. Description of the Related Art

Generally, a pneumatic tire is being used with air filled therein in order to absorb vibrations caused by uneven road surfaces, thereby increasing durability of the vehicle and providing a comfortable ride to passengers. In a tire, a tread pattern comprising a plurality of dimples and grooves is formed on the tread portion which is to be in contact with the road surface, thereby enhancing the steering and driving capabilities of the vehicle.

However, when the vehicle is being driven, the tire is excited according to the curvature and the surface of the road, and the excited tire causes turbulence in the air inside (the tire cavity) of the assembly comprising the wheel and the tire. The turbulence in the air inside of the assembly comprising the wheel and the tire causes a noise. The space, which is formed by the assembly comprising the wheel and the tire, functions as a resonance box causing a resonance phenomenon, thereby amplifying such noise further.

The resonance frequency associated with a tire structure has a specific frequency of the tire corresponding to the integer multiples of the speed of sound divided by the length of the circumference of the air layer.

In Korean Patent Application Publication No. 2008-0070862, Japanese Patent No. 5078907, Japanese Patent No. 3727024, Japanese Patent No. 3974437 and the like, positioning of a sound-absorbing material inside of a tire is suggested for reducing the noise caused by the resonance.

In addition, a tire is being driven under the very harsh environmental conditions. Continuous impact, bending and stretching are occurring, and also the tire operating temperatures are various such as high temperature, room temperature, and low temperature. For example, when braking and accelerating the vehicle, the tire temperature tends to increase rapidly, while the temperature is maintained at a constant level during normal driving, and the tire temperature is low in a season like winter.

In Korean Patent Application Publication No. 2011-0042068, sound-absorbing materials having elasticity values of 4-15% are described. However, it is described that the visco-elasticity performance of such sound-absorbing material is consistent at the high temperature between 70° C. and 80° C. but in a low temperature, a foaming agent of different chemical material must be used, thereby implying that the visco-elasticity cannot be maintained at a low temperature.

In addition, in Japanese Patent Nos. 3787343 and 4330550, it is described that the durability of the sound-absorbing material can be enhanced by making the tensile strength in the range of 70 kPa to 120 kPa, or 70 kPa to 160 kPa. However, only application of the double-sided adhesive tapes having high peel strength (splitting resistance) at room temperature and high temperatures for such sound-absorbing materials is described, but any means for enhancing the adhesive strength at lower temperatures are not described.

Thus, since the studies on adhesion capability and durability of the conventional sound-absorbing materials for a tire with reduced cavity noise are not sufficient, it is quite common that the sound-absorbing material is peeled as the stress is focused on the bonded interface due to the deformation caused by the vibration of the tire, or the sound-absorbing material is damaged due to the external temperature.

Moreover, although it is disclosed in Japanese Patent No. 3622957 that the ratio of the volume of the sound-absorbing material to the total volume of the tire inner cavity is to be more than 0.4% in order to enhance sound-absorption capability, there is a problem of degradation in durability due to the heavy compressed deformation at the top area of the sound-absorbing material corresponding to the height thereof.

In addition, it is disclosed in Japanese Patent No. 3964878 that the ratio of the volume of the sound-absorbing material to the total volume of the tire inner cavity is to be 0.4-20%, however, there is a problem that the sound-absorption capability cannot be maximized.

SUMMARY

In view of the above, it is an objective of the present invention to provide a cavity noise reduction tire for maximizing the effect on cavity noise reduction and simultaneously maintaining the durability of the sound-absorbing material.

According to one aspect of the present invention, there is provided a cavity noise reduction tire comprising a tread portion, a bead assembly being disposed at each side of the tread portion, and a sidewall portion for connecting the tread portion and the bead assembly, characterized in that the tire includes a sound-absorbing material disposed therein, and the ratio of a cross-section area of the sound-absorbing material with respect to a cross-section area of an inner cavity of the tire ranges from 23% to 29%.

It preferable that a bottom width measured from left to right of the sound-absorbing material is 55% of a maximum width measured from left to right of the tire, and a top width measured from left to right of the sound-absorbing material is 50% of the maximum width.

It preferable that a vertical slope is formed at a lower portion of a side of the sound-absorbing material, and a slanted slope is formed at an upper portion of the side of the sound-absorbing material.

It preferable that a plurality of grooves are formed along a circumference of the tire on a top of the sound-absorbing material.

It preferable that the sound-absorbing material is formed of porous material, and an area of the sound-absorbing material being in contact with the tire is subjected to a surface treatment to have a closed-cell structure.

It preferable that the sound-absorbing material is installed at the tire using a double-sided adhesive tape.

It preferable that the sound-absorbing material is attached to an inside of the tread portion, a ratio of the cross-section area of the sound-absorbing material with respect to that of a space formed inside of the tire ranges from 23% to 29%, and the sound-absorbing material is formed of a porous material.

It preferable that the sound-absorbing material is formed of porous polyurethane foam having elasticity of more than 20%.

It preferable that the sound-absorbing material has tensile strength of more than 2.3 kgf/cm$^2$.

It preferable that the density of the sound-absorbing material is 33-45 kg/m$^3$.

It preferable that the elongation rate of the sound-absorbing material is more than 340%.

It preferable that the sound-absorbing material is attached to an inside of the tread portion, and the sound-absorbing material is formed of porous polyurethane foam having elasticity of more than 20% if measured according to JIS K 6401.

It preferable that compression and restoration of the sound-absorbing material are repeated while driving.

DETAILED DESCRIPTION OF EMBODIMENTS

Hereinafter preferred exemplary embodiments of the present invention will be described with reference to the accompanying drawings.

For reference, among the configurations of the present invention which will be described hereinafter, for the configurations which are identical to the ones in the prior art, the foregoing prior art will be referred to, and the detailed descriptions are omitted.

Exemplary Embodiment 1

As illustrated in FIGS. 1 to 5, a cavity noise reduction tire 10 according to the present invention includes a tread portion 1; a bead assembly 2 which is disposed at both sides of the tread portion 1; and a sidewall portion 3 which connects the tread portion 1 and the bead assembly 2, wherein the tire 10 further includes a sound-absorbing material 5 disposed inside of the tire 10. According to this exemplary embodiment, the ratio of the cross-sectional area B of the sound-absorbing material with respect to the cross-sectional area of the space (which is equal to A+B) formed by the internal surface of the tire 10 is 23-29%.

Figure 1:
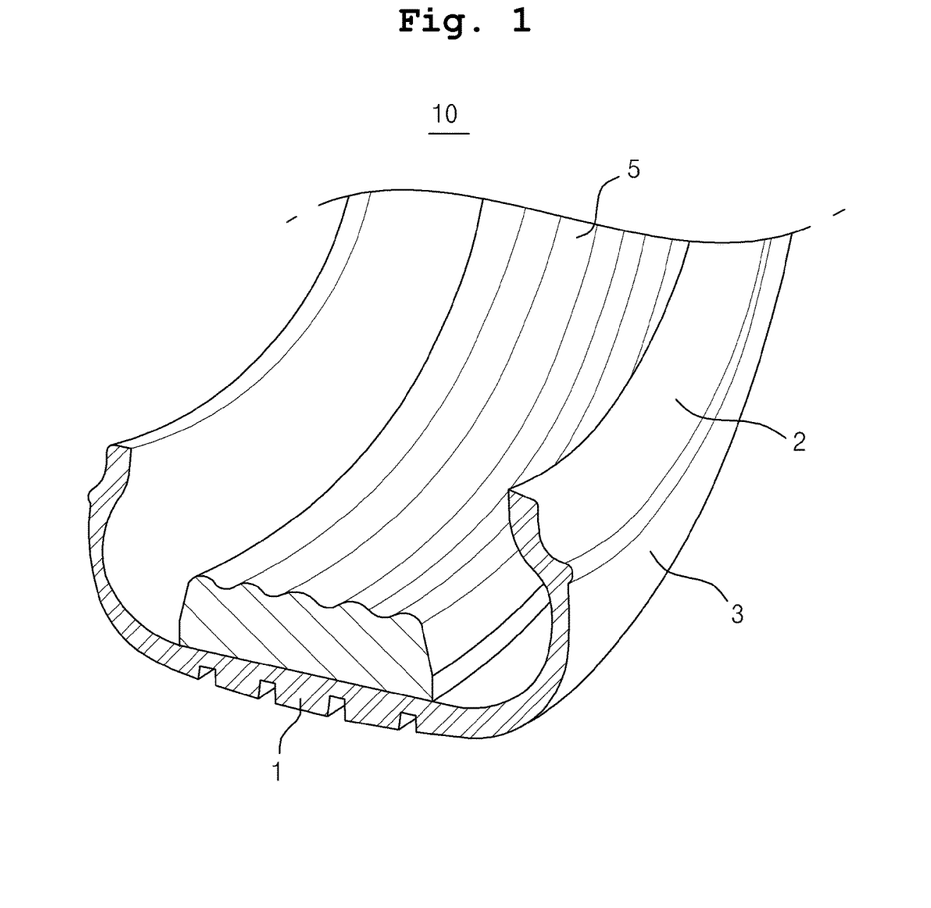
FIG. 1 is a prospective view of the cavity noise reduction tire according to the first exemplary embodiment of the present invention.

As illustrated in FIG. 1, the tire 10 includes: a tread portion 1; a bead assembly 2 which is disposed at both sides of the tread portion 1; and a sidewall portion 3 which connects the tread portion 1 and the bead assembly 2.

The sound-absorbing material 5 is installed inside of the tread portion 1, and disposed inside of the tire 10.

The sound-absorbing material 5 is installed in the tread portion 1 by using double-sided adhesive tape (not shown here).

In other words the double-sided adhesive tape is disposed between the sound-absorbing material 5 and the tread portion 1.

The sound-absorbing material 5 is formed to have a strip shape, and it becomes a ring as both ends meet each other.

Figure 2:
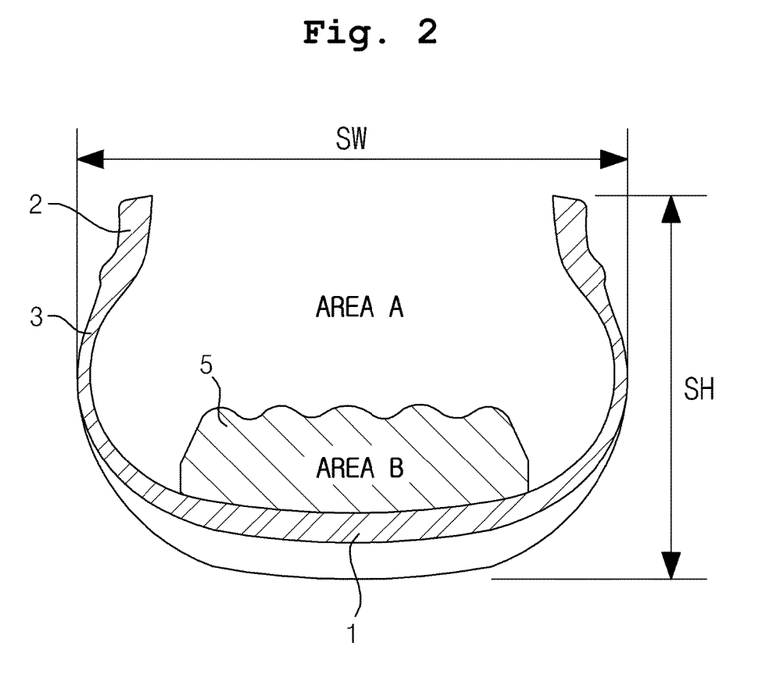
FIG. 2 is a cross-sectional view of the cavity noise reduction tire according to the first exemplary embodiment of the present invention.

The ratio of the cross-sectional area B of the sound-absorbing material 5 with respect to the cross-sectional area of the space (which is equal to A+B) formed by internal surface of the tire 10 is 23-29%.

In other words, cross-sectional area ratio (RA) is expressed as:

$$RA = \frac{B}{A+B} \times 100(\%)$$

Figure 3:
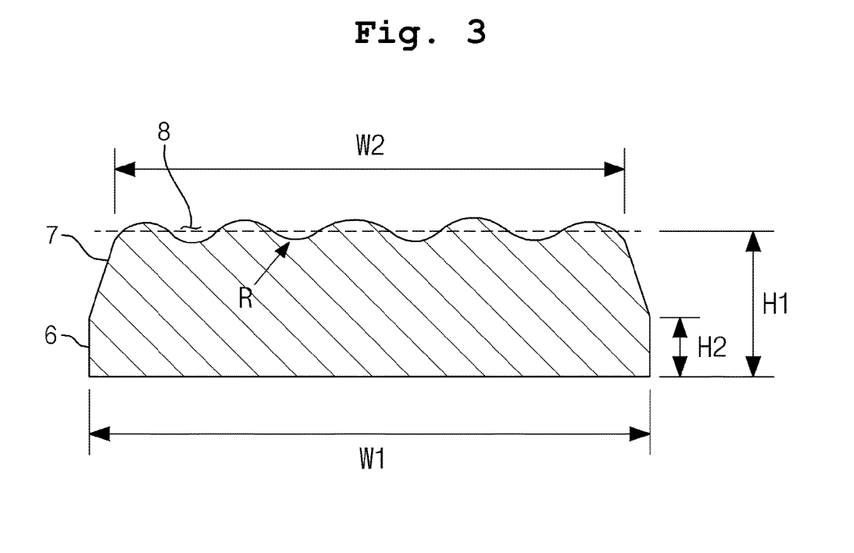
FIG. 3 is a cross-sectional view of the sound-absorbing material of the cavity noise reduction tire according to the first exemplary embodiment of the present invention.

For the sound-absorbing material 5, the bottom width measured from left to right thereof is formed to be longer than the top width measured from left to right.

The bottom width W1 measured from left to right of the sound-absorbing material 5 is 55% of the maximum width SW measured from left to right of the tire 10, and the top width W2 measured from left to right of the sound-absorbing material 5 is 50% of the maximum width SW measured from left to right of the tire 10.

The left end and the right end of the sound-absorbing material 5 for defining the top width W2 measured from left to right of the sound-absorbing material 5, are the end points meeting with the horizontal line passing the median point between the maximum point and the minimum point of the waveform which will be described hereinafter.

In addition, a vertical slope 6 is formed at the lower portion of the side of the sound-absorbing material 5, and a slanted slope 7 is formed at the upper portion of the side. The height of the slanted slope 7 is formed to be greater than the height of the vertical slope 6.

The height H1 of the sound-absorbing material 5 is determined by the following equation:

$$H1 = \frac{RA \times SW \times SH \times 0.75}{0.5 \times W1 \times 0.5 \times W2}$$

SH is the height which is the length from the bottom and to the top of the tire 10.

The height H2 of the vertical slope 6 is determined by the following equation:

$$H2 = H1 \times 0.5$$

Further, a plurality of (four, for example) grooves 8 are formed along the circumference of the tire 10 on the top of the sound-absorbing material 5, thus the top area of the sound-absorbing material 5 is formed to be corrugated. Therefore, the cross-sectional shape of the top of the sound-absorbing material 5 is formed to be a wave-like shape.

The grooves 8 are formed to be an arc shape, the radius R is determined by the following equation:

$$R=0.0005 \times (W1)^2 + 0.0475 \times W1$$

W1 is the bottom width measured from left to right of the sound-absorbing material 5.

The sound-absorbing material 5 is formed of porous polyurethane foam.

In the sound-absorbing material 5, the area being in contact with the tread portion 1 of the tire 10 has a closed-cell structure (i.e., a structure where pores are formed inside but not exposed outwardly) by being subjected to a surface treatment such as a heat treatment and the like. During the heat treatment, heat is applied to the surface, which is in contact with the tread portion 1, of the sound-absorbing material 5.

Figure 4:
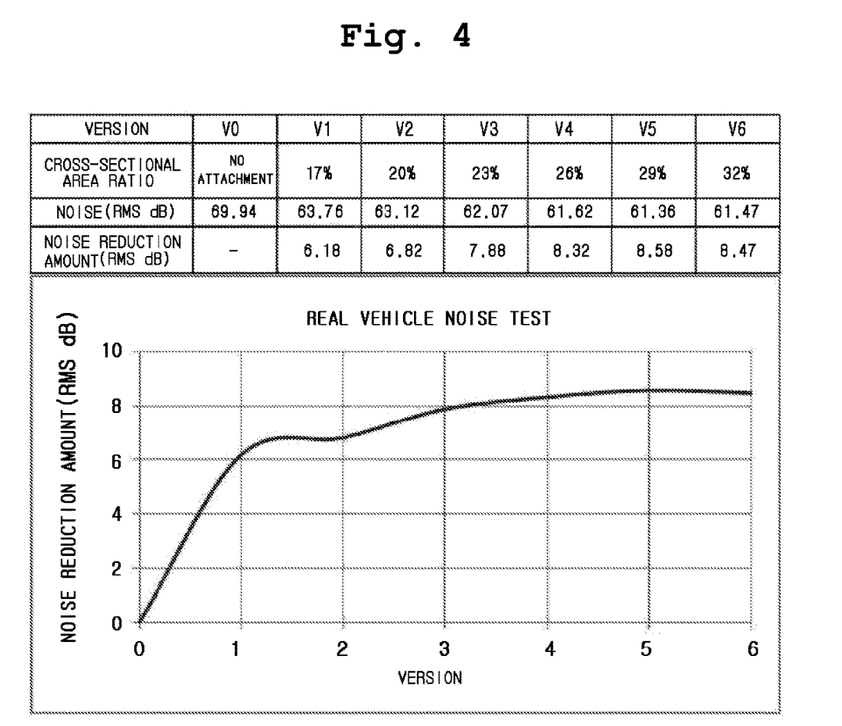
FIG. 4 is a table and a graph showing the result of the sound absorption test for the sound-absorbing material of an exemplary embodiment and a comparison example according to the first exemplary embodiment of the present invention.

The table and the graph in FIG. 4 are the result of the sound absorption performance test for the sound-absorbing material 5.

Figure 5:
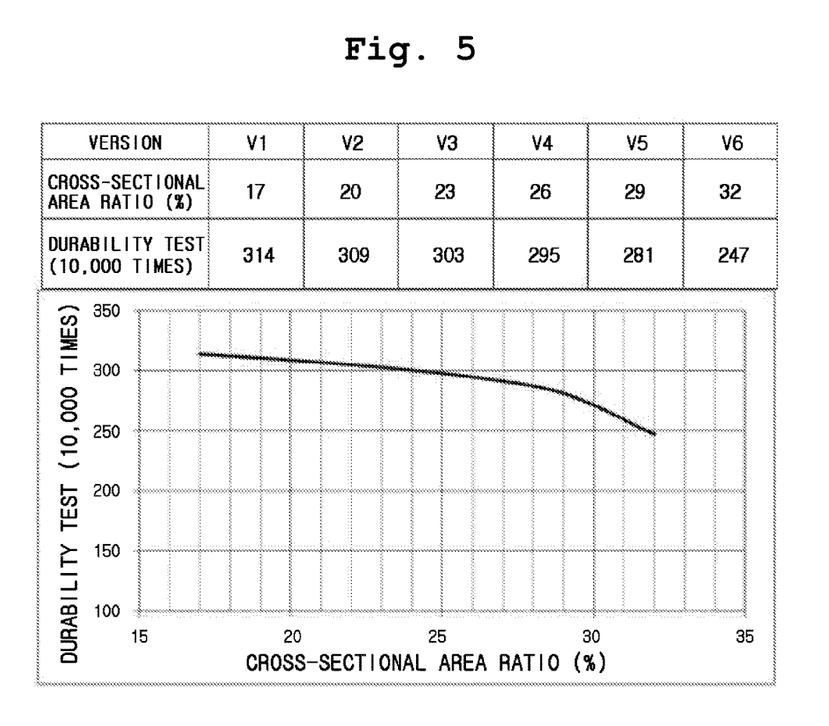
FIG. 5 is a table and a graph showing the result of durability testing for the sound-absorbing material of an exemplary embodiment and a comparison example in FIG. 4.

The table and the graph in FIG. 5 are the result of durability testing for the sound-absorbing material 5.

The exemplary embodiments V3, V4, and V5 and the comparison examples V0, V1, V2, and V6 are the sound-absorbing materials formed of the porous polyurethane foam having different cross-sectional area ratios.

The test results shows that the noise is reduced by 7.88 dB, 8.32 dB, 8.58 dB for the sound-absorbing material 5 having the cross-sectional area ratio RA is 23-29% as described in the exemplary embodiment, and at the same time, the durability also turned out to be high showing 3.03 million times, 2.95 million times, and 2.81 million times as shown in the low temperature durability test results performed at the low temperature of −20° C.

Noise test was performed at an air pressure of 32 psi, with an applied weight load of a real vehicle (base on a large passenger vehicle), and at 60 km/h and 80 km/h speeds using a 245/45R19 tire.

Low temperature durability test is performed using the method described as follows. Low temperature durability test uses a low temperature Ross Flexing test equipment, and 90 degree bend test is performed at the speed of 2 times per second at −20° C. In addition, the test specimen, which is used for low temperature durability test, is prepared to have 25 mm in width, 15 mm in height, and 200 mm in length.

As V6 shown in a comparison example 4, the sound-absorbing capability is good when the cross-sectional area ratio RA exceeds 32%, however, the durability turned out to be low as 2.47 million times lower than the 2.8 million times required for a standard tire lifetime.

The durability is degraded due to the severe compressive deformation occurred in the top area depending on the height (depending on the cross-sectional area ratio) of the sound-absorbing material 5 inside of the tire 10.

Figure 6:
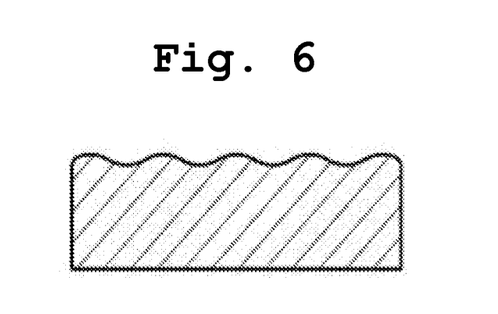
FIGS. 6 to 11 are the cross-sections of the sound-absorbing materials according to the various exemplary embodiments of the present invention.

The sound-absorbing material may be formed to have same widths measured from left to right for the top and the bottom thereof, and wave-like grooves may be formed on the top area as illustrated in FIG. 6.

Figure 7:
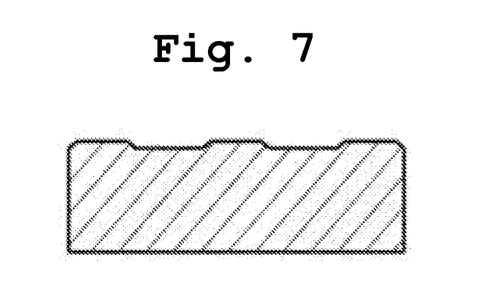

The sound-absorbing material may be formed to have same widths measured from left to right for the top and the bottom thereof, and two grooves may be formed on the top area, wherein slanted surfaces are formed on each side such that the widths of the grooves are upwardly widening as illustrated in FIG. 7.

The durability of such sound-absorbing material is excellent since grooves formed on the top thereof are shallow.

Figure 8:
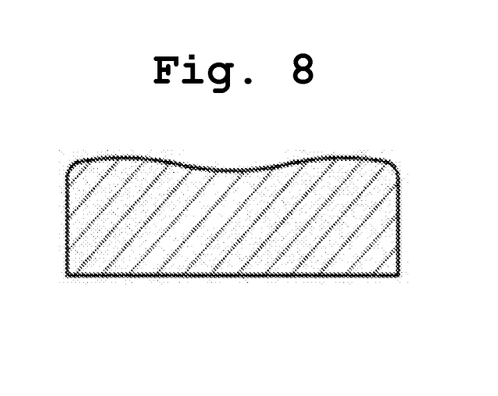

The sound-absorbing material, as illustrated in FIG. 8, may be formed to have same widths measured from left to right for the top and the bottom thereof, and the grooves are formed such that the top area becomes a gradually streamlined shape, and the grooves may be formed to have a larger radius than the grooves formed in the sound-absorbing material illustrated in FIG. 6.

Figure 9:
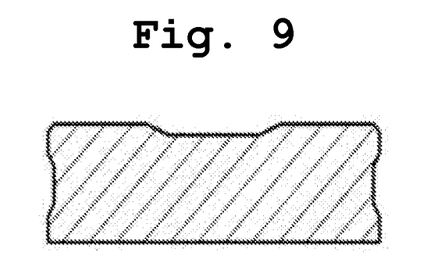

The sound-absorbing material, as illustrated in FIG. 9, may be formed on both sides and on the top area producing angled shapes.

Figure 10:
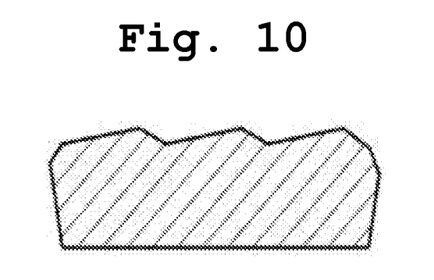

The sound-absorbing material, as illustrated in FIG. 10, may be formed to have two slanted sides, and angled grooves are formed on the top area, wherein the shapes of the cross-sections of both sides may be differently formed to be asymmetric with respect to the center line.

Figure 11:
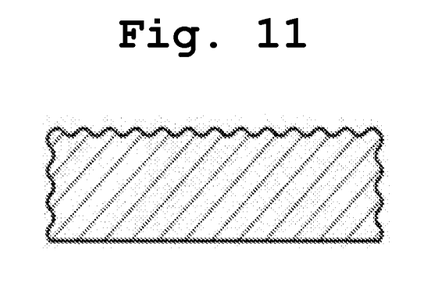

The sound-absorbing material, as illustrated in FIG. 11, may be formed to have a plurality of grooves having wave-like shape on the top area and both sides.

The grooves described in FIGS. 6 to 11 are formed along the longitudinal direction of the sound-absorbing material.

Exemplary Embodiment 2

As illustrated in FIG. 1 and FIGS. 12 to 15, a cavity noise reduction tire 10 according to the present invention includes: a tread portion 1; a bead assembly 2 disposed at both sides of the tread portion 1; and a sidewall portion 3 which connects the tread portion 1 and the bead assembly 2, wherein the tire 10 includes a sound-absorbing material 5 which is disposed inside of the tire 10. According to this exemplary embodiment, compression and restoration of the sound-absorbing material 5 are continuously repeated while driving, and the sound-absorbing material 5 is made of porous polyurethane foam having elasticity of more than 20%.

As illustrated in FIG. 1, the tire 10 includes: a tread portion 1; a bead assembly 2 which is disposed at both sides of the tread portion 1; and a sidewall portion 3 which connects the tread portion 1 and the bead assembly 2.

The sound-absorbing material 5 is installed inside of the tread portion 1, and disposed inside of the tire 10.

The sound-absorbing material 5 is installed in the tread portion 1 by using double-sided adhesive tape (not shown here).

In other words the double-sided adhesive tape is disposed between the sound-absorbing material 5 and the tread portion 1.

The sound-absorbing material 5 is formed to have a strip shape, and it becomes a ring as both ends meet each other.

For the sound-absorbing material 5, the bottom width measured from left to right thereof is formed to be longer than the top width measured from left to right.

In addition, a vertical slope 6 is formed at the lower portion of the side of the sound-absorbing material 5, and a slanted slope 7 is formed at the upper portion of the side. The height of the slanted slope 7 is formed to be greater than the height of the vertical slope 6.

Further, a plurality of (four, for example) grooves 8 are formed along the circumference of the tire 10 on the top of the sound-absorbing material 5, thus the top area of the sound-absorbing material 5 is formed to be corrugated. Thus, the cross-sectional shape of the top of the sound-absorbing material 5 is formed to be a wave-like shape.

The sound-absorbing material 5 is formed of porous polyurethane foam.

In this description, although the elasticity and the density values measured according to JIS K 6401 are being used, and the tensile strength and the elongation rate measured according to JIS K 6301 are being used, it is not necessarily to be measured according to the corresponding standards, but may also be measured using any method if the measurements can be performed in accordance with the same theory and the principle of the above mentioned standards.

The sound-absorbing material 5 has tensile strength of more than 2.3 kgf/cm$^2$, and the density of the sound-absorbing material is 33-45 kg/m$^3$, and the elongation rate of the sound-absorbing material is more than 340%.

Bending and stretching in the tire 10 continuously occur while driving the vehicle. Hence, in the sound-absorbing material 5 which is attached inside of the tire 10, compression and restoration continuously occur at the end area towards the driving direction of the contact area where the tire 10 is in contact with the road surface. In other words, the elasticity and the restoring force are the important material properties of the sound-absorbing material 5 required for the tire 10.

A repeated bend test, which can evaluate the elasticity and restoring force of the sound-absorbing material 5, was separately performed at room temperature, high temperature, and low temperature under the real environmental condition where the tire is being used.

Figure 12:
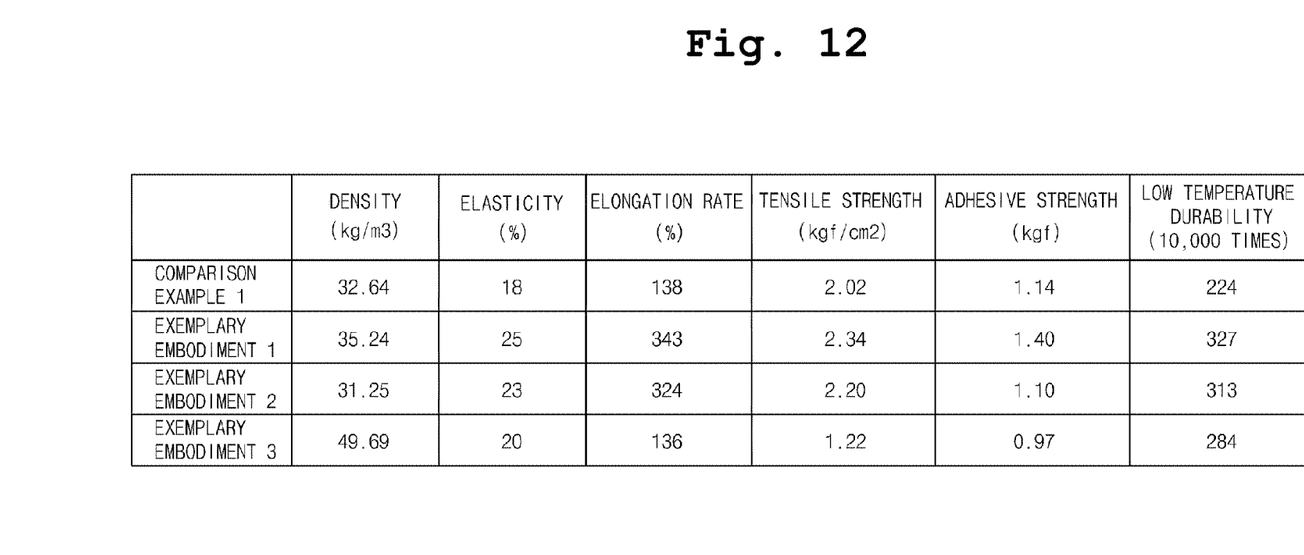
FIG. 12 is a table showing the adhesion and the low temperature durability test results with respect to the physical parameters of the sound-absorbing material of the cavity noise reduction tire according to the second exemplary embodiment of the present invention.

The exemplary embodiments 1, 2, and 3, and the comparison example 1 are the sound-absorbing materials made of porous polyurethane foam having physical properties which are different from each other.

They were evaluated at room temperature of 25° C. and at high temperature of 80° C., and the exemplary embodiments 1, 2, and 3, and the comparison example 1 showed equivalent performance.

Figure 14:
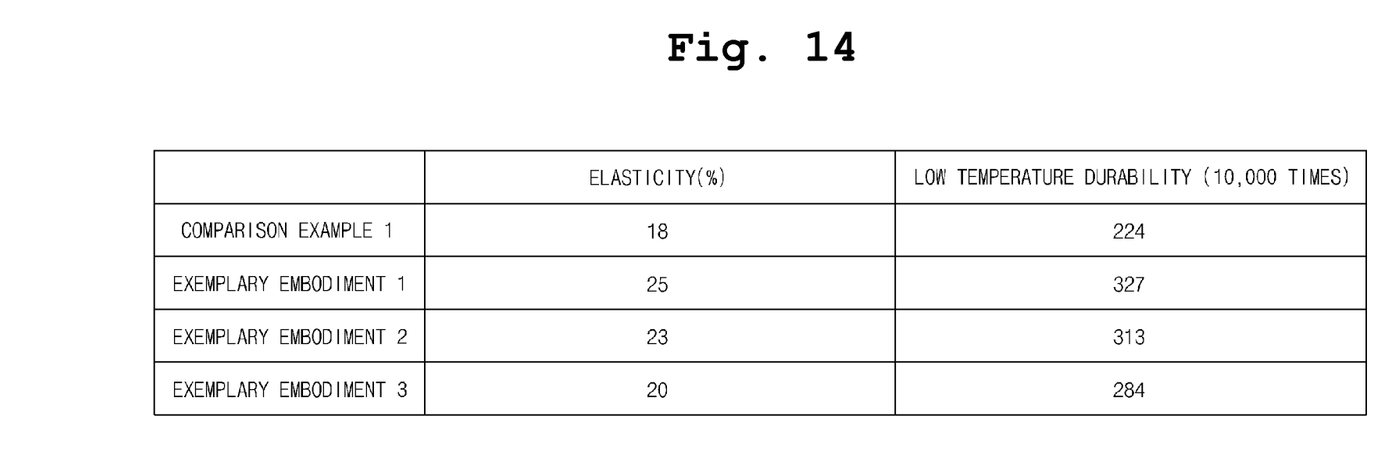
FIG. 14 is a table showing the low temperature durability test result with respect to the elasticity of the sound-absorbing material of the cavity noise reduction tire according to the second exemplary embodiment of the present invention.

FIGS. 12 and 14 show the results of the low temperature durability test for the exemplary embodiments 1, 2, and 3, and the comparison example 1 at the low temperature of −20° C.

The low temperature durability test is performed under the severity which is 10 times higher than that of real compression and restoration of the tire, and it is proceeded with a method described as follows. The low temperature durability test uses a low temperature Ross Flexing test apparatus, and the 90 degrees bend test is performed at a speed of 2 times per second at the temperature of −20° C. The test specimen which is being used in the low temperature durability test is fabricated to have a width of 25 mm, a height of 15 mm, and a length of 200 mm.

According to the test results, as shown in the exemplary embodiment of the present invention, when the elasticity of the sound-absorbing material is greater than 20%, the number of repeated bend in durability testing is 2,840,000; thus, the low temperature durability is extremely enhanced than the other comparison example, and the minimum required number of repeated bend, which is about 2,800,000 for a general tire lifetime, is sufficed.

Figure 13:
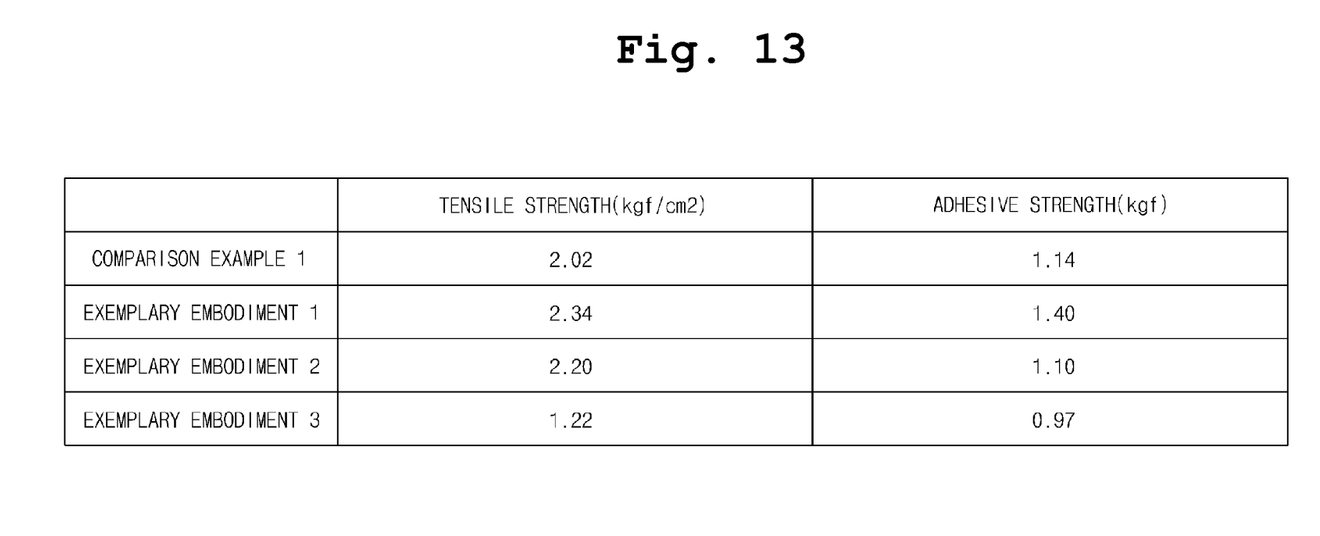
FIG. 13 is a table showing the peel test result with respect to the tensile strength of the sound-absorbing material of the cavity noise reduction tire according to the second exemplary embodiment of the present invention.

FIGS. 12 and 13 show the peel test results of the exemplary embodiments 1, 2, and 3 and the comparison example 1.

In a peel test, after attaching the sound-absorbing material 5 inside of the tire 10 with the double-sided adhesive tape, the strength that is needed for separating the sound-absorbing material 5 and the tire 10 by pulling the ends of the sound-absorbing material 5 and the tire 10 vertically with respect to the attachment surface is measured.

Figure 15:
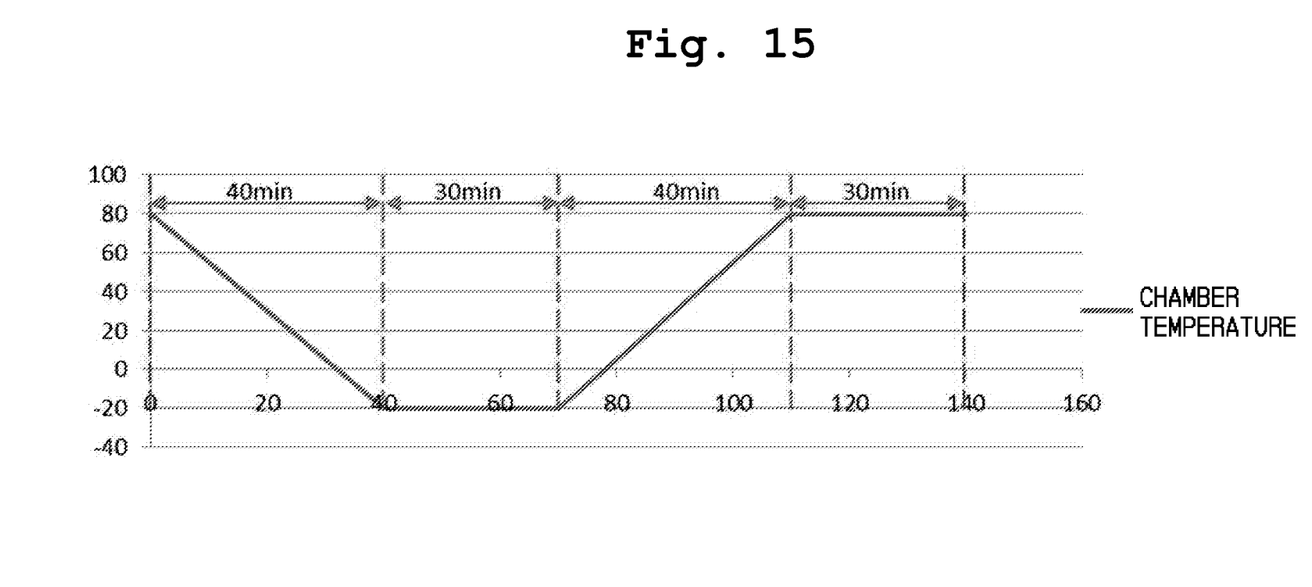
FIG. 15 is a graph showing the variations of the chamber temperature within one cycle of heat shock during the peel test of the cavity noise reduction tire according to the second exemplary embodiment of the present invention.

Specifically, in the peel test, the maximum value until separation occurs by applying vertical tensile force with a speed of 305 mm/min. A test specimen used in the peel test is prepared by attaching the sound-absorbing material to the inner liner of the tire using the double-sided adhesive tape, and a primer is coated on the sound-absorbing material and the attachment surface of the inner liner. The test specimens being used are fabricated to have: a width of 40 mm, a length of 123 mm, and a height of 25 mm for the sound-absorbing material; and a width of 50 mm, a length of 80 mm, and a height of 2 mm for the inner liner. The double-sided adhesive tape is attached to only on 60 mm of the end portion of the sound-absorbing material. After going through the adhesion aging and stabilizing process for about 24 hours at the room temperature of about 24° C. within the chamber, then 30 cycle heat shock test is performed on the test specimens followed by peel test. As illustrated in FIG. 15, within one cycle of heat shock, the chamber temperature is decreased from 80° C. to −20° C. for 40 minutes, then −20° C. is maintained for 30 minutes, then the temperature is increased from −20° C. to 80° C. for 40 minutes, then 80° C. is maintained for 30 minutes.

As described in the exemplary embodiment 1, the test results shows that when the sound-absorbing material 5 has tensile strength of more than 2.3 kgf/cm$^2$, thus the adhesive strength is more than 1.4 kgf/cm$^2$, which means the adhesive strength is extremely enhanced than the other comparison example.

According to the cavity noise reduction tire of the present invention, the following advantageous effects can be obtained.

Since the ratio of the cross-sectional area of the sound-absorbing material with respect to that of the space formed by the internal surface of the tire is 23-29%, the cavity noise reduction effect is maximized, and the durability of the sound-absorbing material may be maintained at the same time.

Since (i) the bottom width measured from left to right of the sound-absorbing material is 55% of the maximum width measured from left to right of the tire, (ii) the top width measured from left to right of the sound-absorbing material is 50% of the maximum width measured from left to right of the tire, (iii) a vertical slope is formed at the lower portion of the side of the sound-absorbing material and a slanted slope is formed at the upper portion of the side, and (iv) a plurality of grooves are formed along the circumference of the tire on the top of the sound-absorbing material, the sound-absorbing capability may be more enhanced.

Since the elasticity of the sound-absorbing material disposed inside of the tire is more than 20%, repeated bending can be performed up to 2,800,000 times during the evaluation test in the low temperature durability test. Therefore, the low temperature characteristics are especially enhanced even in case compression and restoration is continuously repeated while driving.

Furthermore, since the sound-absorbing material has tensile strength of more than 2.3 kgf/cm$^2$, the adhesive strength is enhanced to exceed 1.4 kgf.

Thus, separation and damage of the sound-absorbing material of the cavity noise reduction tire of the present invention can be prevented under the various environmental conditions in the high temperature and the low temperature regions and the like, thus, the performance of the cavity noise reduction tire can be maintained consistently.

Although the present invention is described with reference to the preferred exemplary embodiment as described above, it will be apparent to the person of ordinary skill in the art that various changes and alterations of the present invention can be made within the scope of the present invention without departing from the spirit and the scope thereof written in the claims described herein below.

What is claimed is:

1. A cavity noise reduction tire comprising:
a tread portion, a bead assembly being disposed at each side of the tread portion, and a sidewall portion for connecting the tread portion and the bead assembly; and
a sound-absorbing material attached to an inner side of the tread portion of the tire,
wherein a ratio of a cross-section area B of the sound-absorbing material with respect to a cross-section area (A+B) of a space formed by an inner surface of the tire ranges from 23% to 29%,
a left-to-right width W1 of a lower end of the sound-absorbing material is 55% of a maximum left-to-right width SW of the tire,
a left-to-right width W2 of an upper end of the sound-absorbing material is 50% of the maximum left-to-right width SW of the tire,
the sound-absorbing material is formed of a porous polyurethane foam having an elasticity of not less than 20% as measured according to JIS K 6401,
the sound-absorbing material has a tensile strength of 2.3 kgf/cm² or more, a density of 33 kg/m³ to 45 kg/m³ and an elongation percentage of 340% or more, thereby reducing a cavity noise and enhancing a low temperature durability,
a vertical slope is formed at a lower portion of a side of the sound-absorbing material, and a slanted slope is formed extending from the vertical slope at an upper portion of the side of the sound-absorbing material such that W1 is longer than W2, and
a plurality of grooves are formed on a top of the sound-absorbing material, each of the grooves extending in a direction parallel to a circumference of the tire, wherein each of the grooves is an arc shape having a radius determined by the following equation:

$$R=0.0005\times(W1)^2+0.0475\times W1.$$

2. The cavity noise reduction tire according to claim 1, wherein an area of the sound-absorbing material being in contact with the inner side of the tread portion has a closed-cell structure.

3. The cavity noise reduction tire according to claim 2, wherein the sound-absorbing material is installed at the inner side of the tread portion using a double-sided adhesive tape.

4. The cavity noise reduction tire according to claim 1, wherein compression and restoration of the sound-absorbing material are repeated while driving.

5. The cavity noise reduction tire according to claim 1, wherein:
the sound-absorbing material is formed of a porous polyurethane foam having an elasticity of 20% to 25% as measured according to JIS K 6401, and
the sound-absorbing material has a tensile strength of 2.3 kgf/cm² to of 2.34 kgf/cm², a density of 33 kg/m³ to 35.24 kg/m³ and an elongation percentage of 340% to 343%.

6. The cavity noise reduction tire according to claim 5, wherein the plurality of grooves comprises at least four grooves.

7. The cavity noise reduction tire according to claim 1, wherein the plurality of grooves comprises at least four grooves.

* * * * *